Inventor:
Charles R. Waseige
By
Attorney.

Nov. 12, 1946. C. R. WASEIGE 2,410,849
MULTIDRIVE GEAR BOX
Filed May 21, 1942 4 Sheets-Sheet 2

Inventor:
Charles R. Waseige
By Allulumbe
Attorney.

Nov. 12, 1946.    C. R. WASEIGE    2,410,849
MULTIDRIVE GEAR BOX
Filed May 21, 1942    4 Sheets-Sheet 3
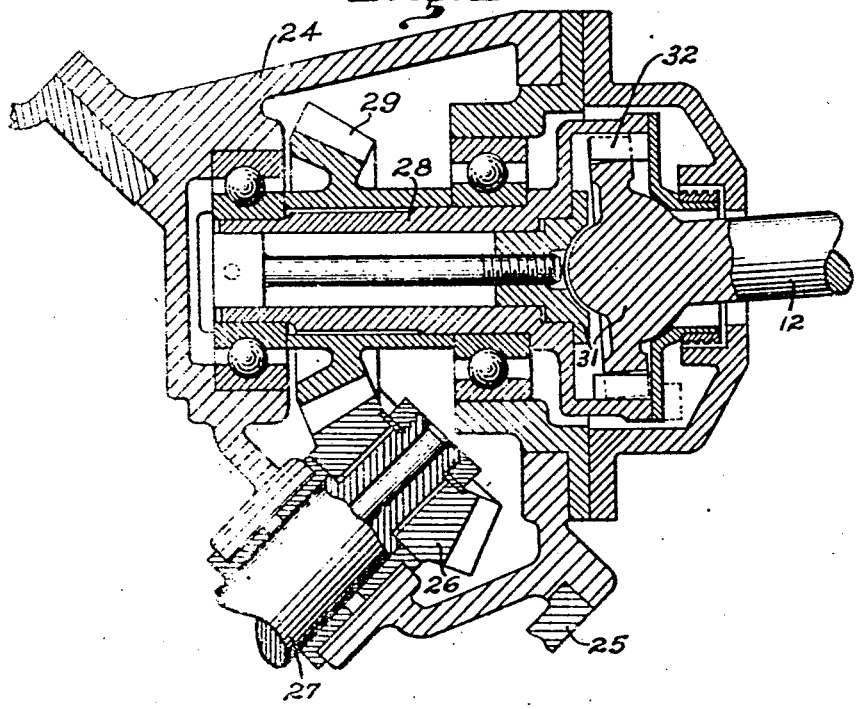
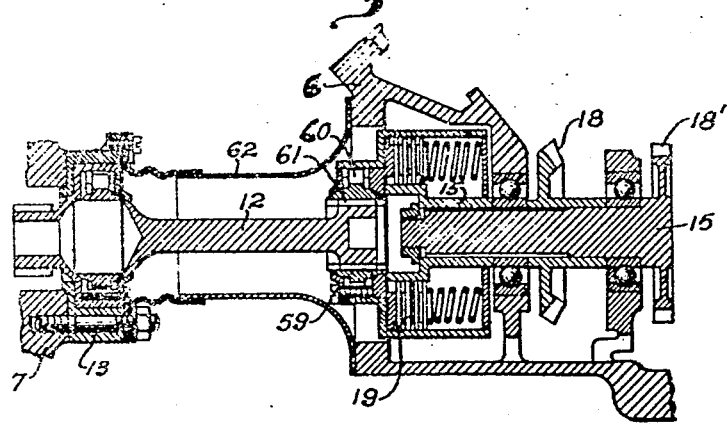
Inventor:
Charles R. Waseige
By [signature]
Attorney.

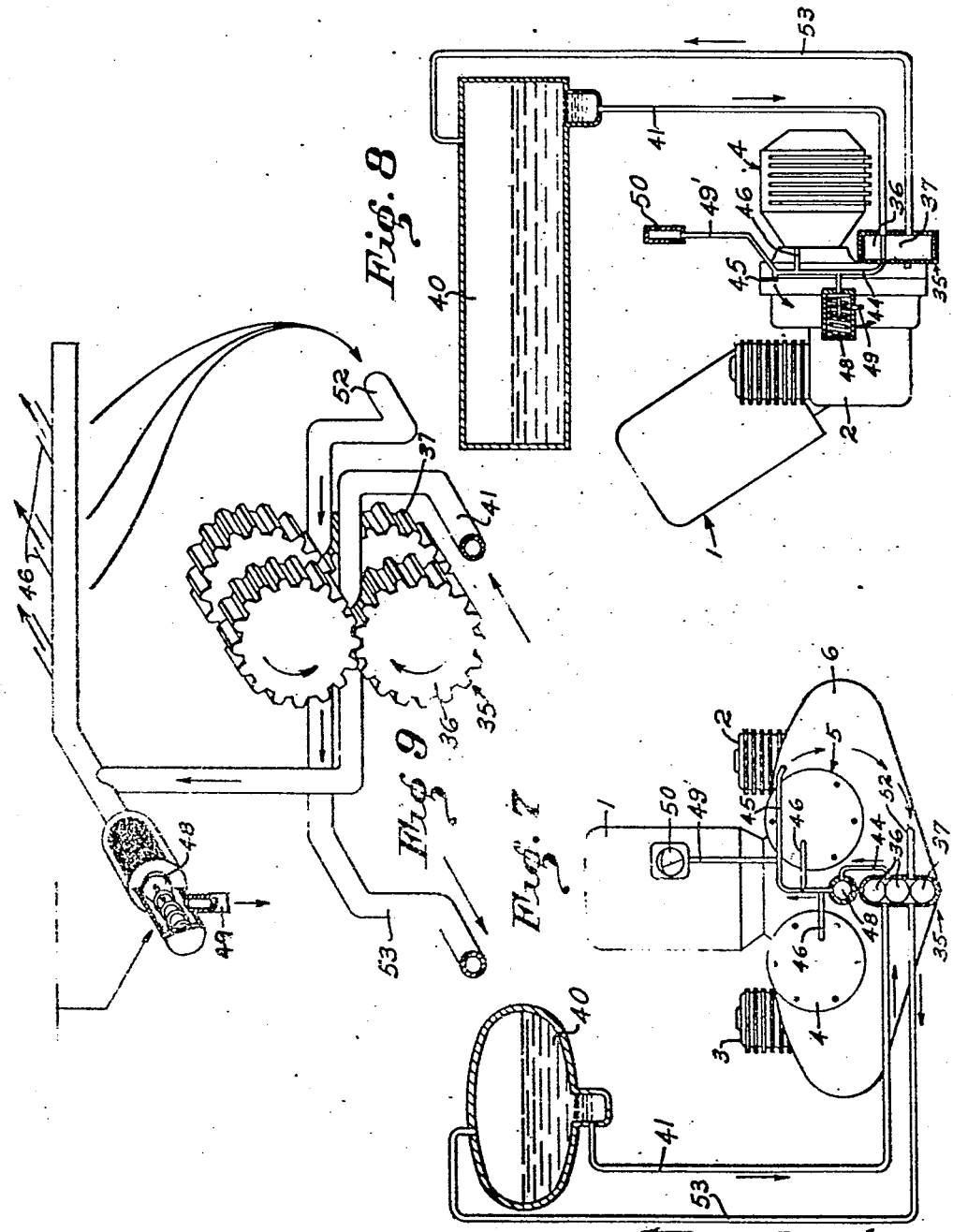

Patented Nov. 12, 1946

2,410,849

UNITED STATES PATENT OFFICE 2,410,849

MULTIDRIVE GEAR BOX

Charles Raymond Waseige, Rueil, France; vested in the Alien Property Custodian

Application May 21, 1942, Serial No. 443,965
In France May 18, 1937

3 Claims. (Cl. 74—389)

The present application forms a continuation in part application of my co-pending application Serial No. 207,115, filed May 10, 1938.

My invention relates to the mounting of accessories on an aircraft or the like.

It is known that modern aircraft are provided with a number of accessory apparatus such for example as high, medium and low pressure air compressors, vacuum pumps, electric generators, hydraulic pumps, etc., the operation of which is necessary for the operation of numerous instruments.

Hitherto such accessories have generally been mounted directly on the engine, but the multiplicity and variety of said accessories makes such a mounting more and more difficult. Furthermore, engine constructors are in that case obliged to provide on their engines brackets and driving devices which are not always used, in the case of multi-engine aeroplanes, for example, and this leads to making the rear parts of engines different, according to the use on the aeroplane, and this is very disadvantageous as regards interchangeability.

It has also been proposed to drive these accessories, especially the generators by means of electric motors or by auxiliary engines, but these solutions are generally heavy and costly, and do not provide for proper lubrication of the accessories.

My invention has for its object a multidrive gear box designed to removably carry accessories and to supply the same with power and with lubricating oil under pressure so that said accessories are operated under exactly the same conditions as are obtained when they are mounted on an engine.

A further object of my invention is a box of the aforesaid type adapted to be fixed to the structure of the airplane and to be driven by the engine through the medium of a common double Cardan shaft or the like, permitting the engine to oscillate or to be displaced relatively to the gear box.

Other objects of my invention will be apparent in the following description taken with reference to the accompanying drawings, showing exemplary embodiments of the invention, and in which:

Figure 4 is a vertical section taken through the movement take-off box on the engine;

Figure 6 is a fragmentary sectional view similar to Figure 3 and showing a modified form of drive shaft construction;

Figure 7 is a diagrammatic view in rear elevation showing the arrangement of the lubricating conduits;

Figure 8 is a diagrammatic view in side elevation further showing the arrangement of the lubricating conduits; and Figure 9 is an isometric diagram on an enlarged scale, showing the arrangement of the oil pump and the conduits related thereto, including the relief valve.

Figure 1:
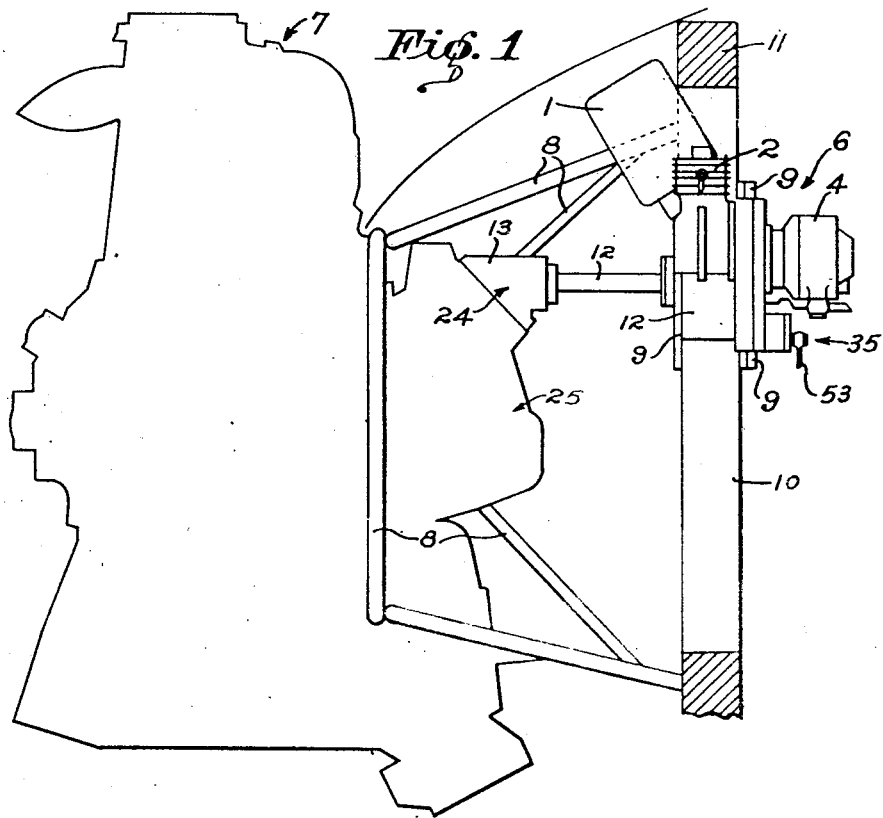
Figure 1 is a fragmentary vertical longitudinal sectional view taken through a portion of the airplane frame behind the engine and showing an arrangement according to the invention in side elevation.
Figure 2:
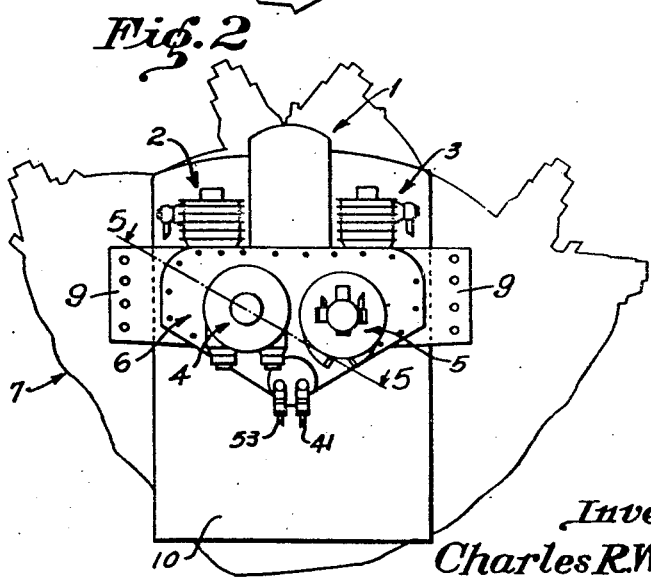
Figure 2 is a rear elevation of said arrangement.

In the embodiment shown it has been assumed that five accessories are to be mounted, namely, an electric generator 1, a high pressure air compressor 2, a medium pressure air compressor 3, a vacuum pump 4 also serving as a low pressure compressor, and a hydraulic pump 5 serving for example for supplying jacks not shown. Said five accessories are fixed on the outside of a case of a multidrive gear box 6 which is directly fixed on the structure of the aeroplane in such a manner that it is independent of the engine 7 carried by its supporting frame 8, by means of horizontal cross pieces 9 which are fixed at their ends on the edges of a window 10 provided in the fire-shield partition 11, which is located to the rear of the engine. The box 6 contains a suitable number of output components, five in this case, which are actuated by a common shaft 12 extending from a driving head 13 fixed on the engine above the movement take-off which is provided for this purpose on the rear of the engine 7.

The gear box 6 consists of a substantially flat case having a vertical and substantially plane rear face and a front face comprising two plane vertical portions on either side of the forwardly projecting nose 14 serving as a housing for the main shaft 15. It is on said plane faces that the accessories are adapted to be mounted so that they cover the movement take-offs. The central nose 14 has at its upper part an inclined plane face 16 which serves as a support for the generator 1. The main shaft 15 drives the various accessories through the medium of its gear 18 and gears on the shafts of the accessories, the shaft 15 being driven by the drive shaft 12 through a friction coupling 19 forming a torque limiting device. The shaft 12 engages endwise with the driving part of the coupling 19 through the medium of splines 20 having a slight play, which by the shaft 12 can assume a slight incline relatively to the shaft 15. Furthermore, the driving splines are shorter than the driven splines so that shaft 12 can slide longitudinally relatively to the coupling. At its opposite end, the shaft 12 penetrates into the driving head 13 which is formed by a case 24 fixed on the casing 25 of the engine 7 above the movement take-off, which is in this case, as shown in Figure 4, formed by a bevel pinion 26 the shaft 27 of which is actuated by the engine 7. The case 24 supports a shaft 28 on which is fixed a pinion 29 meshing with the pinion 26 and said shaft 28 is connected to the shaft 12 by a swivel joint 31 and splines 32 similar to the splines 20. The shaft 12 is furthermore so dimensioned as to form a resilient shaft which damps the vibrations and the variations of torque of the engine.

At the end of the shaft 17 which is intended for driving the generator, is arranged a torque limiting device 34 which is adjusted in such a manner that it can only transmit the maximum torque required for normally driving the generator, in order to protect the members of the gear box from the effects of inertia of the rotor of the generator in the event of a sudden stoppage of the engine.

Figure 3:
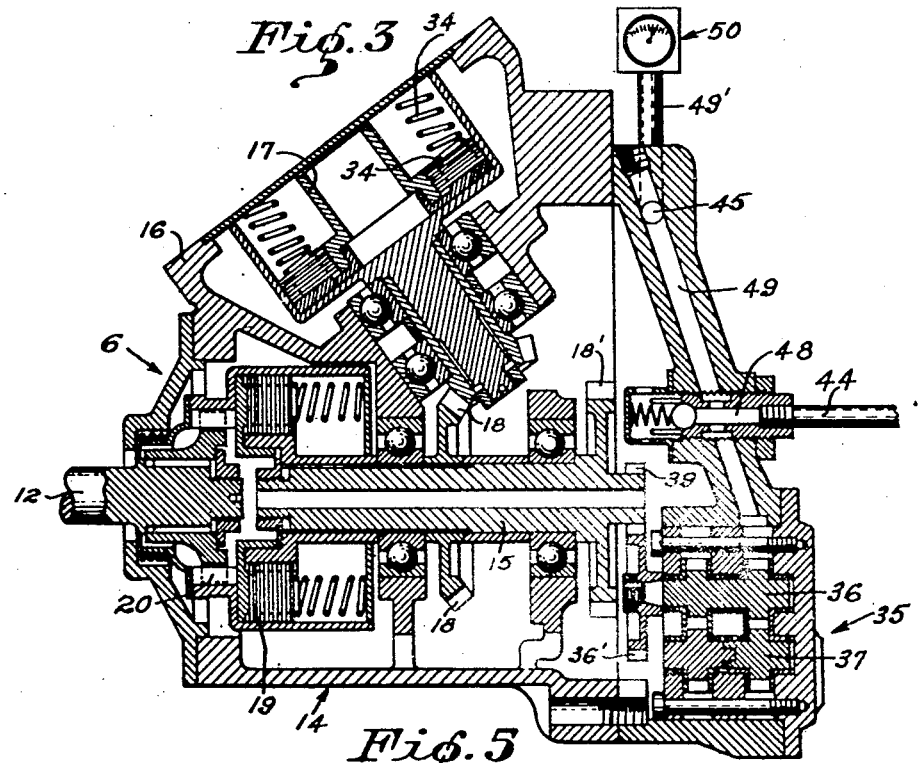
Figure 3 is a vertical section, on an enlarged scale, taken through the movement take-off box, along the axis of its drive shaft.
Figure 5:
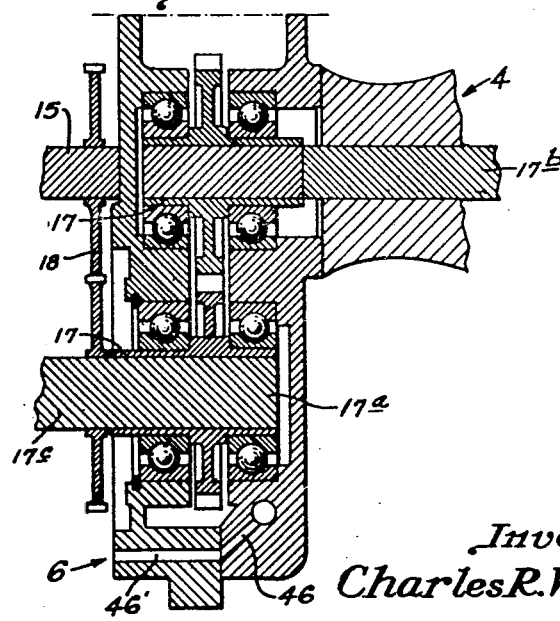
Figure 5 is a fragmentary section on an enlarged scale taken along the line 5—5 of Figure 2.

The case of the gear box furthermore contains a double gear pump 35 comprising a first pair of gears 36 forming an oil pump proper, coupled with a further pair of gears 37 forming a scavenging pump (Figs. 3 and 7 to 9). Both said pairs of gears are driven through the intermediary of a gear 36' meshed with a pinion 39 on the main shaft 15.

As shown in Fig. 7, the gears 36 suck oil from the oil tank 40, which may be the oil tank of the engine, through the pipe 41 and force same through a pipe 44 in a lubricating circuit. The said circuit includes on the one hand conduits 45 adapted to supply the gears of the box itself and further conduits 46 opening through faces of the case of the box and connecting with corresponding passages 46' provided in the fixing flanges of the accessories 2, 3, 4, 5, which engage with the front and rear faces of the box 6. The pipe 44 is in communication with a spring pressed relief valve 48 provided with an overflow pipe 49, and through a pipe 49' (Figs. 3, 7 and 8) with a pressure gauge 50.

The oil which has lubricated the accessories the gear box, together with the oil used for the lubrication of the gear box is sucked up at the bottom of the case by the inlet pipe 52 of the scavenging pump formed by the gears 37, and is delivered through the pipe 53 to the oil tank 40. The case of the gear box is thus kept relatively dry, thereby preventing a condition leading to losses of oil, which are particularly objectionable on board aircraft shown in accessories is obtained together with their driving.

In the modification of construction of Fig. 6, a swivel joint 59 is provided to support the end of the drive shaft 12 at the entrance of the movement take-off box 6. The two male and female parts are connected to each other by driving splines 60 which allow them a slight transverse play and the driving part is mounted on the shaft 12 by means of a splined sliding mounting 61. The shaft 12 is furthermore spacedly surrounded by a protecting casing 62 having a flexible or resiliently deformable part.

Of course my invention is in no way limited to the structural details described or illustrated herein which have been given only by way of example. Thus there may be any number of accessories and they may be distributed in any manner over the common movement take-off box. The swivel jointed modification shown in Fig. 6 can be used for the driving head which is fixed on the engine or again simultaneously on both ends of the shaft 12. The oil pump which forms the lubricating means for the movement take-off box may also be separately fitted on the outside of the case, instead of being incorporated therein.

I therefore aim in the appended claims to cover all such changes and modifications.

What I claim is:

1. In a power plant for a vehicle or the like, said power plant involving an engine having a power take-off and accessories including a generator, high, low, and medium pressure compressors, a vacuum pump, and a hydraulic pump; the improvement of an accessory assembly comprising a casing mounted on the vehicle independently of and at one side of said engine, a main shaft mounted horizontally in said casing, flexible means operatively connecting the engine end of said main shaft with the engine power take-off, said main shaft having a bevel gear and other gearwheels, an inclined portion on the upper part of said casing on which said generator is mounted with a bevel pinion operatively connecting its shaft with the bevel gear on the main shaft, said high and medium pressure compressors mounted on the casing at opposite sides of said main shaft and having pinion shafts meshed with one of said other gearwheels, said low pressure compressor and said hydraulic pump being mounted at opposite sides of said main shaft on a wall of the casing remote from the engine with pinion shafts meshed with one of said other gearwheels, and lubricating means comprising a depressed sump in the lower part of said casing, a gear pump mounted on said remote wall of the casing and drawing lubricant from said sump, said gear pump having a pinion shaft meshed with another of said gearwheels on the main shaft, and lubricant passages leading to the regions of said gearwheels and pinions from the output side of the gear pump.

2. In a power plant for a vehicle or the like involving an engine having a power take-off and companion accessories including a generator, high, low, and medium pressure rotary compressors, a rotary vacuum pump, and a rotary hydraulic pump, the improvement of an assembly mounted on the vehicle adjacent to but independently of the engine for operatively supporting said accessories, said assembly comprising a casing having a transversely elongated vertical wall on its side remote from the engine, a depressed lower part forming a sump adjacent to said vertical wall, and a slanting upper face on its upper part declining toward the engine, a main substantially horizontal main shaft journalled intermediate the upper and lower portions of said casing, flexible means operatively connecting the adjacent end of the main shaft with the engine power take off, said main shaft having a bevel gearwheel and other gearwheels thereon, said generator being mounted on said slanting face, a generator driving shaft connected with the generator shaft and having a bevel pinion meshed with the main shaft bevel gear, said high and medium pressure rotary compressors being mounted on the ends of the casing substantially on a line with said main shaft and having their shafts geared to one of said other gearwheels on the main shaft, said low pressure compressor and said hydraulic pump being mounted on said vertical wall of the casing on opposite sides of the middle of said vertical wall and having their shafts positioned laterally inwardly of the high and medium pressure compressors and geared to one of said other gearwheels on the main shaft, and a lubricant rotary gear pump mounted on the lower part of said vertical wall and within said sump and having its shaft geared to another of said other gearwheels on the main shaft, said lubricant pump having its intake side communicating with said sump, and conduit means on the walls of said casing and leading from the output side of the lubricant pump to the regions of the meshed gears and gearwheels.

3. A unit for the separate mounting of the accessories of a vehicle engine, including its generator, rotary compressors and the like, said unit comprising a casing mounted on the vehicle independently of and adjacent to the engine, said casing having an inclined upper generator mounting face, a vertical wall remote from the engine for mounting the compressors and the like, and a depressed bottom forming a lubricant sump, a main shaft journalled in the casing intermediate its top and bottom and directed away from and having its adjacent end operatively connected to the engine power take-off, said main shaft having a bevel gearwheel and other gearwheels, a generator driving shaft mounted in the casing on an incline and having a bevel pinion at its lower end meshed with said bevel gearwheel on the main shaft and a torque-limiting coupling at its upper end, said generator being mounted on said inclined generator mounting face with its shaft operatively connected to the generator driving shaft by said torque-limiting coupling, said rotary compressors and the like being mounted on said vertical wall with their shafts extending substantially parallel to and geared to said other gearwheels of the main shaft.

CHARLES RAYMOND WASEIGE.